United States Patent
Berscheid et al.

[11] Patent Number: 5,980,791
[45] Date of Patent: Nov. 9, 1999

[54] METHOD FOR FORMING A MOLDED-IN LIFTER FOR CLEANING A FLEXIBLE MAGNETIC DISC

[75] Inventors: Joseph D. Berscheid, Fergus Falls, Minn.; Randy L. Carlson; Jeffrey T. Gibbs, both of Wahpeton, N. Dak.; Ronald H. Turchin, Fergus Falls, Minn.; Kristi L. Limke, Gilbert; Lee M. Langseth, Chandler, both of Ariz.

[73] Assignee: Imation Corp., Oakdale, Minn.

[21] Appl. No.: 08/869,394

[22] Filed: Jun. 5, 1997

Related U.S. Application Data

[63] Continuation-in-part of application No. 08/682,268, Jul. 17, 1996, abandoned.

[51] Int. Cl.[6] .................................................. B29C 59/02
[52] U.S. Cl. ....................... 264/40.1; 264/296; 264/320; 360/133; 360/135; 428/65.3; 428/65.5
[58] Field of Search ................................ 264/296, 320, 264/322, 40.1, 138, 162; 360/133, 135; 428/65.3, 65.5

[56] References Cited

U.S. PATENT DOCUMENTS

| | | | |
|---|---|---|---|
| 3,917,772 | 11/1975 | Hollenbeck | 264/41 |
| 4,044,188 | 8/1977 | Segal | 428/283 |
| 4,499,995 | 2/1985 | Turner | 360/133 |
| 4,510,546 | 4/1985 | Asami et al. | 360/133 |
| 4,620,247 | 10/1986 | Papciak et al. | 360/97 |
| 4,626,949 | 12/1986 | Brock et al. | 360/133 |
| 4,630,728 | 12/1986 | Matsumoto et al. | 206/313 |
| 4,654,742 | 3/1987 | Harris et al. | 360/133 |
| 4,677,516 | 6/1987 | Iizuka et al. | 360/133 |
| 4,750,075 | 6/1988 | Oishi | 360/133 |
| 4,789,916 | 12/1988 | Oishi | 360/133 |
| 4,814,926 | 3/1989 | Gulbrandsen | 360/133 |
| 4,839,766 | 6/1989 | Kato | 360/133 |
| 4,843,511 | 6/1989 | Downey | 360/133 |
| 5,006,948 | 4/1991 | Fukunaga et al. | 360/133 |
| 5,029,319 | 7/1991 | Doi | 360/133 |
| 5,081,556 | 1/1992 | Ikebe et al. | 360/133 |
| 5,083,231 | 1/1992 | Veenstra et al. | 360/133 |
| 5,090,010 | 2/1992 | Takahashi | 369/291 |
| 5,216,566 | 6/1993 | Obara et al. | 360/133 |
| 5,282,106 | 1/1994 | Salto et al. | 360/133 |
| 5,498,456 | 3/1996 | Ikebe et al. | 360/133 |
| 5,619,391 | 4/1997 | Getzoyan et al. | 360/133 |

FOREIGN PATENT DOCUMENTS

| | | |
|---|---|---|
| 0 653 756 A2 | 5/1995 | European Pat. Off. . |
| 3540560 A1 | 5/1986 | Germany . |
| 60-20374 | 2/1985 | Japan . |
| 60-40582 | 3/1985 | Japan . |
| 62-164663 | 10/1987 | Japan . |
| 62-270080 | 11/1987 | Japan . |
| 63-24772 | 2/1988 | Japan . |
| 63-32778 | 2/1988 | Japan . |
| 63-191386 | 8/1988 | Japan . |
| 5-62415 | 3/1993 | Japan . |

OTHER PUBLICATIONS

Photomicrographs of a "molded–in lifter" on the inner surface of the base shell of a 3 ½" micro–floppy diskette sold by KAO, 2 sheets.

Photomicrographs of a "molded–in lifter" on the inner surface of the base shell of a 3 ½" micro–floppy diskette sold by KAO, 1 sheet.

(List continued on next page.)

*Primary Examiner*—Jan H. Silbaugh
*Assistant Examiner*—Michael Poe
*Attorney, Agent, or Firm*—Eric D. Levinson

[57] ABSTRACT

A method for forming a molded-in lifter for supporting a fabric liner of a flexible magnetic recording disc so that the disc is cleaned by rotation of the disc with respect to the liner when the disc is housed within a cartridge. The lifter is a raised rib that has a controlled height typically provided by deforming a molded-in rib to the desired height. The cartridge may also include a recess in the shell opposite the rib to receive the rib and prevent or reduce compression of the media if the cartridge is compressed.

29 Claims, 10 Drawing Sheets

OTHER PUBLICATIONS

Photomicrographs of a "molded–in lifter" on the inner surface of the base shell of a 3 ½" micro–floppy diskette sold by Maxell, 1 sheet.

Photomicrographs of a "molded–in lifter" on the inner surface of the base shell of a 3 ½" micro–floppy diskette sold by Sony, 1 sheet.

Photomicrographs of a "molded–in lifter" on the inner surface of the base shell of a 3 ½" micro–floppy diskette sold by Verbatim, 1 sheet.

Photomicrographs of a "molded–in lifter" on the inner surface of the base shell of a 3 ½" micro–floppy diskette sold by Fuji, 1 sheet.

Photomicrographs of a "molded–in lifter" on the inner surface of the base shell of a 3 ½" micro–floppy diskette sold by TDK, 1 sheet.

Photomicrographs of a "molded–in lifter" on the inner surface of the base shell of a 3 ½" micro–floppy diskette sold by 3M, 1 sheet.

METHOD FOR FORMING A MOLDED-IN LIFTER FOR CLEANING A FLEXIBLE MAGNETIC DISC This application is a continuation-in-part application of U.S. patent application Ser. No. 08/682,268 entitled "MOLDED-IN LIFTER FOR CLEANING A FLEXIBLE MAGNETIC DISC" filed on Jul. 17, 1996, now abandoned.

FIELD OF THE INVENTION

The present invention relates generally to flexible magnetic recording disc cartridges, and more specifically to a lifter for lifting a fabric liner in such cartridges to contact and thereby clean a disc in the cartridge.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3½ inches (8.9 cm) or less are known as micro-floppy discs. Generally, the micro-floppy disc is accommodated in a hard casing to form a cartridge. The micro-floppy disc comprises a thin circular magnetic recording medium having a hub at its center.

The cartridge generally includes a fabric liner on both inner surfaces of the casing. The liner is contacted with the recording surface of the disc to remove debris on the recording surface while the disc is rotated. The liner has a width at least equal to the width of the recording region of the disc, and is forced against the entire width of the recording surface by a lifter secured to the inner surface of the casing.

A prior art micro-floppy magnetic recording disc cartridge 10 is shown in FIG. 1. The cartridge 10 is comprised of two cartridge shells 12A and 20A which enclose a floppy magnetic recording disc 16. The shells 12A and 20A each have a fabric liner 14 and 18, respectively, on their inner surface which approximates the shape of the disc 16. A prior art lifter 22 is provided in the form of a separate sheet of material that is affixed to the inner surface of the shell 20A and angled to apply pressure on the fabric liner 18. That pressure causes the fabric to rub against the disc 16, thereby cleaning the disc when it is rotated in the cartridge 10. The amount of resistance provided by lifter 22 and fabric liners 14 and 18 against rotation of the floppy disc 16 may be regulated during manufacture by adjusting the degree to which the lifter is angled from shell 20A.

SUMMARY OF THE INVENTION

Prior art lifters, such as lifter 22, suffer from at least two disadvantages. First, such lifters are separate pieces from the cartridge shell, and thus require separate formation, must be properly positioned on the inner surface of the shell, and must be secured to the shell, e.g., by an adhesive or by ultrasonic welding. Second, because the lifters are bent upward at a certain angle with respect to the casing, over time the lifter may fatigue and the angle may gradually decrease, resulting in decreased cleaning of the magnetic floppy disc, as well as decreased torque applied against the rotation of the disc.

To address the disadvantages of the prior art lifters, the lifter according to the present invention comprises a raised rib, physically and chemically integral with one shell of the cartridge. As such, it is not formed, positioned, or secured to the shell separately. Nor does it fatigue over the life of the disc, thereby maintaining the cleaning properties and resulting in more uniform torque during disc rotation.

In one aspect, the present invention includes a lifter for supporting a fabric liner of a flexible magnetic recording disc so that the disc is cleaned by rotation of the disc with respect to the liner, wherein the disc is housed within a cartridge comprising first and second shells, each having inner and outer surfaces, the lifter comprising an elongated raised rib formed on the inner surface of the first shell, the rib being physically and chemically integral with the inner surface of the first shell, wherein the rib has a controlled height above the inner surface of the first shell.

In another aspect, the present invention provides a lifter for supporting a fabric liner of a flexible magnetic recording disc so that the disc is cleaned by rotation of the disc with respect to the liner, wherein the disc is housed within a cartridge comprising first and second shells, each having inner and outer surfaces, the lifter comprising a generally radial elongated raised rib formed in an inner surface of the first shell, the rib being physically and chemically integral with the inner surface of the first shell; and a recessed area formed in the second shell, wherein the recessed area is opposed from the rib in the first shell when the first and second shells are mated together.

In another aspect, the present invention provides a molded-in lifter for supporting a fabric liner of a flexible magnetic recording disc so that the disc is cleaned by rotation of the disc with respect to the liner, wherein the disc is housed within a cartridge comprising first and second shells, each having inner and outer surfaces, the invention comprising an elongated raised rib formed in the inner surface of the first shell, the rib being physically and chemically integral with the inner surface of the first shell, wherein the rib has a height of about 0.4 to about 0.9 millimeters above the inner surface of the first shell; and a raised structure formed in the inner surface of the second shell, the raised structure being physically and chemically integral with the inner surface of the first shell, wherein the raised structure is offset tangentially from the rib in the first shell when the first and second shells are mated.

The present invention also provides a flexible magnetic recording disc cartridge having first and second shells and a lifter for supporting a fabric liner and flexible magnetic recording disc between the first and second shells so that the disc is cleaned by rotation of the disc with respect to the liner, the lifter comprising a generally radial elongated raised rib formed in an inner surface of the first shell, the rib being physically and chemically integral with the inner surface of the first shell; and a recessed area formed in the second shell, wherein the recessed area is opposed from the rib in the first shell when the first and second shells are mated together.

The present invention also provides a method of forming a lifter for supporting a fabric liner of a flexible magnetic recording disc so that the disc is cleaned by rotation of the disc with respect to the liner, wherein the disc is housed within a cartridge comprising first and second shells, each having an inner and outer surface, the method comprising the steps of providing a first shell having a raised rib on its inner surface, the rib having a formed height; and adjusting the height of the raised rib to a controlled height by deforming the rib. Preferably, the height of the rib is adjusted by cold forming. The method may also include providing a recess in the second shell opposite the rib in the first shell.

These and other features and advantages of the invention are described below, with reference to the accompanying figures.

BRIEF DESCRIPTION OF THE DRAWINGS

The present invention will be further understood with reference to the accompanying drawing wherein.

DETAILED DESCRIPTION OF THE INVENTION

The present invention provides a magnetic recording disc cartridge having a lifter in the form of a molded-in rib that has a controlled height to effect cleaning of the medium in the cartridge and methods of manufacturing the same. As used in connection with the present invention, the term "controlled height" refers to the height of the molded rib after deformation to adjust the height of the rib above an inner surface of the shell. In other words, the rib is first molded to a height close to the desired finished height and then deformed after molding to have a controlled height. By deforming the rib after the molding process, increased accuracy of the rib height can be achieved, resulting in better control over the torque needed to rotate the media in the cartridge.

Figure 2:
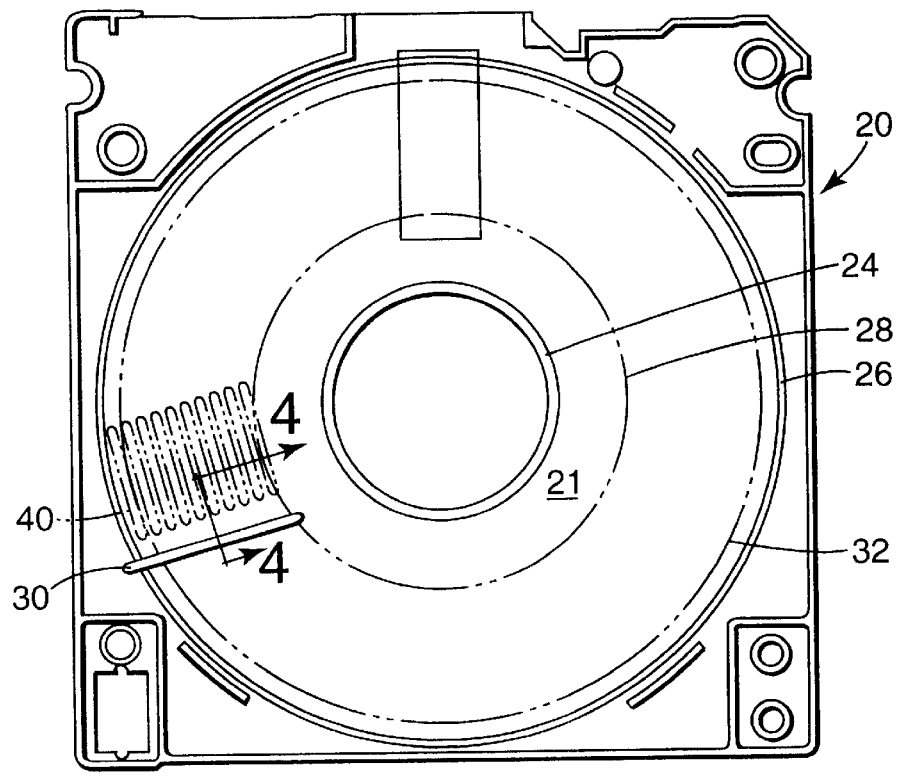
FIGS. 2 and 3 are plan views of the inner surfaces of the back and cover shell, respectively, of one magnetic recording disc cartridge according to the present invention.
Figure 3:
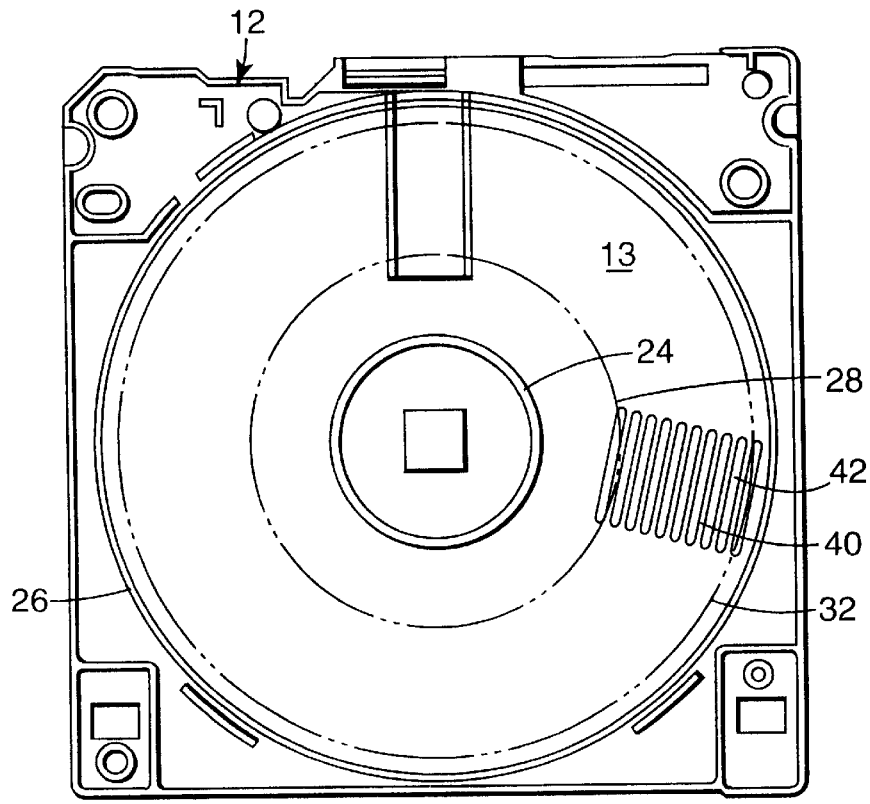

FIGS. 2 and 3 depict the inner surfaces of one embodiment of a cartridge shell incorporating a lifter according to the present invention. FIG. 2 shows the inner surface of a back shell 20 while FIG. 3 shows the inner surface of a cover shell 12. Back shell 20 includes a rib 24 defining the inner periphery of the media compartment of the cartridge and a rib 26 defining the outer periphery of the compartment. Magnetic recording medium 16 has innermost data storage tracks 28 and outermost data storage tracks 32.

A raised rib 30 according to the present invention preferably spans the width of the recordable portion of medium 16 from innermost data storage track 28 to outermost data storage track 32. Rib 30 is positioned on the inner surface of cartridge shell 20 so that it does not lie directly above the raised structure 40 on the inner surface of shell 12 (shown in FIG. 3) when the two shells are assembled together. The relationship between rib 30 and raised structure 40 is shown in FIG. 2, with raised structure 40 being shown in phantom lines. A cross-section taken through rib 30 and a portion of raised structure 40 is shown in FIG. 4.

The raised structure 40 in shell 12 preferably comprises an array of tangential ridges extending above the inner surface of the shell 12. It will be understood, however, that the raised structure 40 could alternatively be comprised of annular or concentric ridges, a generally planar solid raised surface, etc. The primary requirement for the raised structure 40 is that it act to deflect the media 16, in combination with rib 30, during rotation to effect sufficient cleaning of the media 16 without excessive torque.

Raised rib 30 preferably has a controlled height above the inner surface 21 of the shell 20 within the range from about 0.5 to about 1.0 mm, more preferably about 0.6 to about 0.9 mm, and is most preferably about 0.81 mm high. These controlled heights are after adjustment of the rib height, if necessary, as described in greater detail below. Raised rib 30 has a width of about 0.4 to about 0.5 mm at its base on inner surface 21. When initially formed along with shell 20, the sides of the rib 30 preferably taper to form a peak on the rib 30. It is preferred that both sides taper towards each other, beginning about 0.38 mm above the inner surface 21 of shell 20, where they come together at a desired height at an angle α, of about 60° as shown in FIG. 4.

Figure 4:
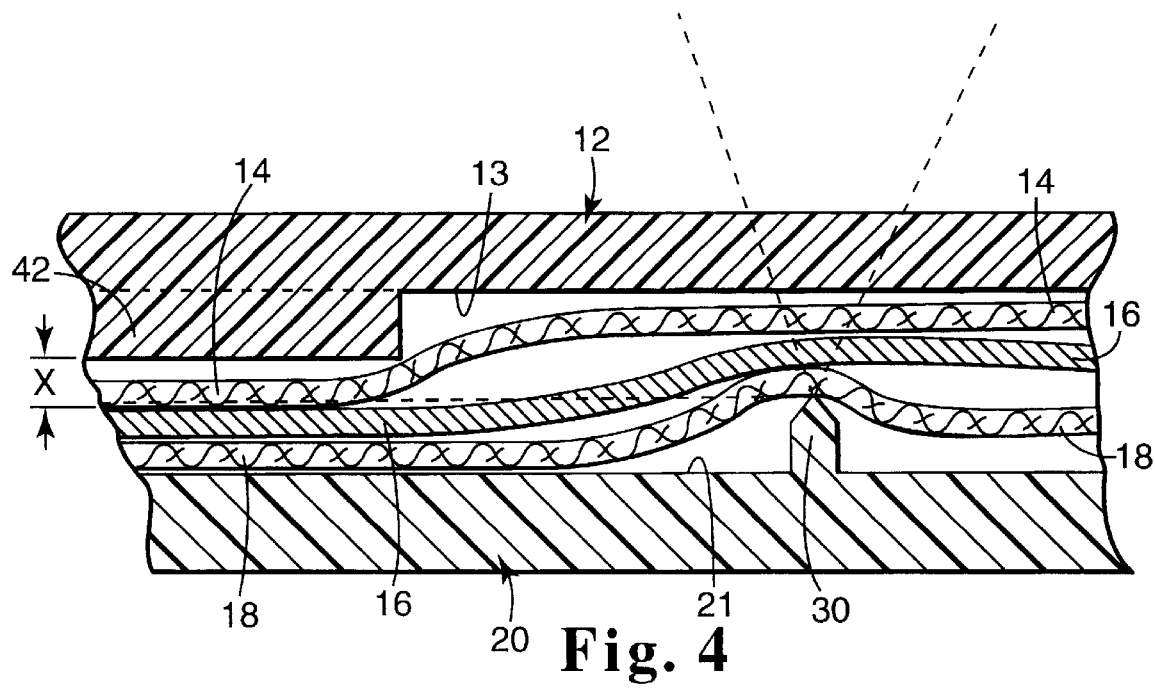
FIG. 4 is a cross-sectional view along line 4—4 in FIG. 2 showing one molded-in lifter according to the present invention.

Raised structure 40 is preferably spaced about 3.8 mm from raised rib 30, as shown in FIG. 4. Raised structure 40 is preferably provided in the form of an array of about ten raised ridges, each ridge having a height above the inner surface 13 of shell 12 within the range from about 0.38 to about 0.48 mm, more preferably about 0.41 to about 0.46 mm, and most preferably about 0.43 mm high.

After assembly, the top of the controlled height rib 30 and the top of raised structure 40 define a height differential, x, of from about 0.1 to about 0.2 mm, more preferably about 0.18 mm. As shown in FIG. 4, the height differential of controlled height rib 30 and raised structure 40 forces medium 16 to form an S-shaped bend as a portion of the medium moves (during rotation) over rib 30 and under raised structure 40. As a portion of medium 16 moves over rib 30, the side of the medium facing rib 30 is cleaned by fabric liner 18. As the same portion of medium 16 moves under raised structure 40, the side of the medium facing raised structure 40 is cleaned by fabric liner 14. The advantage of this design is that it provides for cleaning of medium 16 while allowing for relatively wide manufacturing tolerances in the formation of the rib 30 and raised structure 40.

Figure 5:
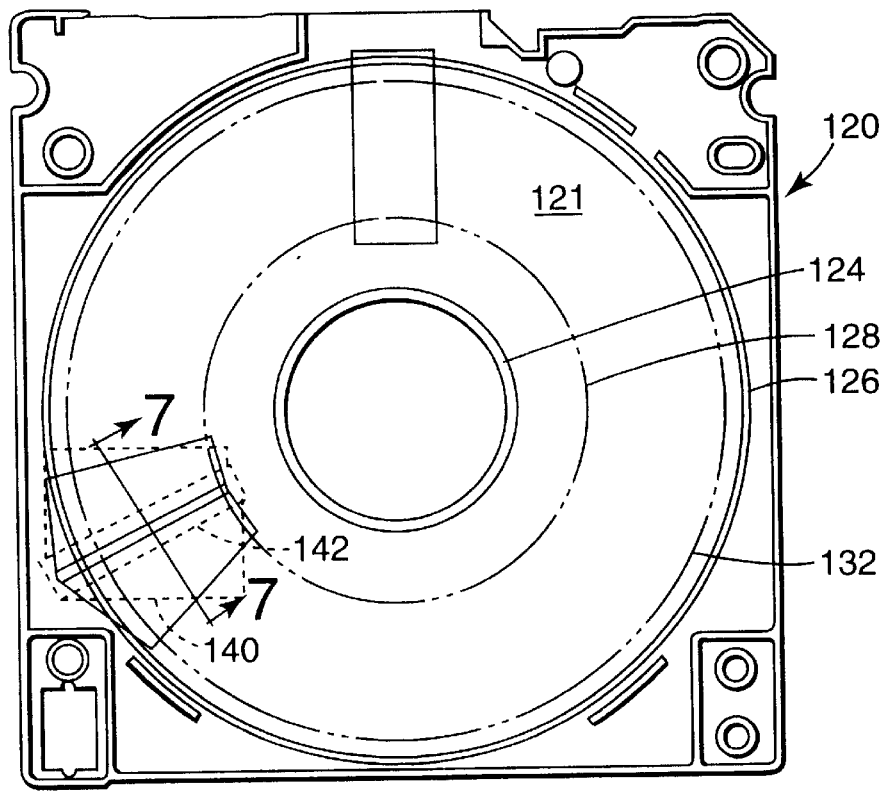
FIGS. 5 and 6 are plan views of the inner surfaces of the back and cover shell, respectively, of one magnetic recording disc cartridge according to the present invention.
Figure 6:
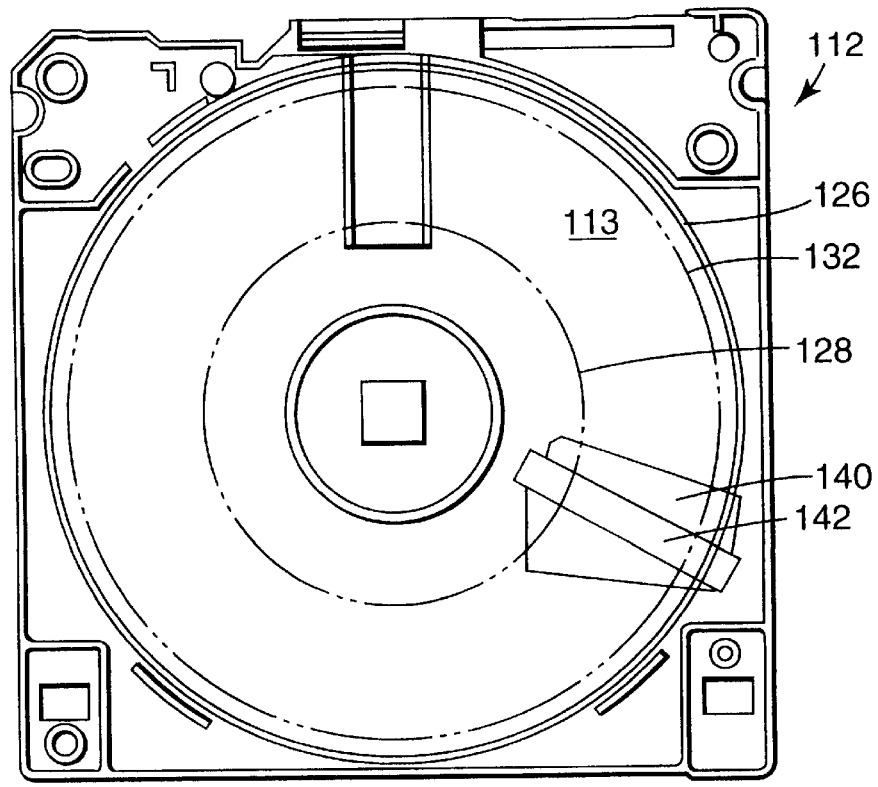
Figure 7:
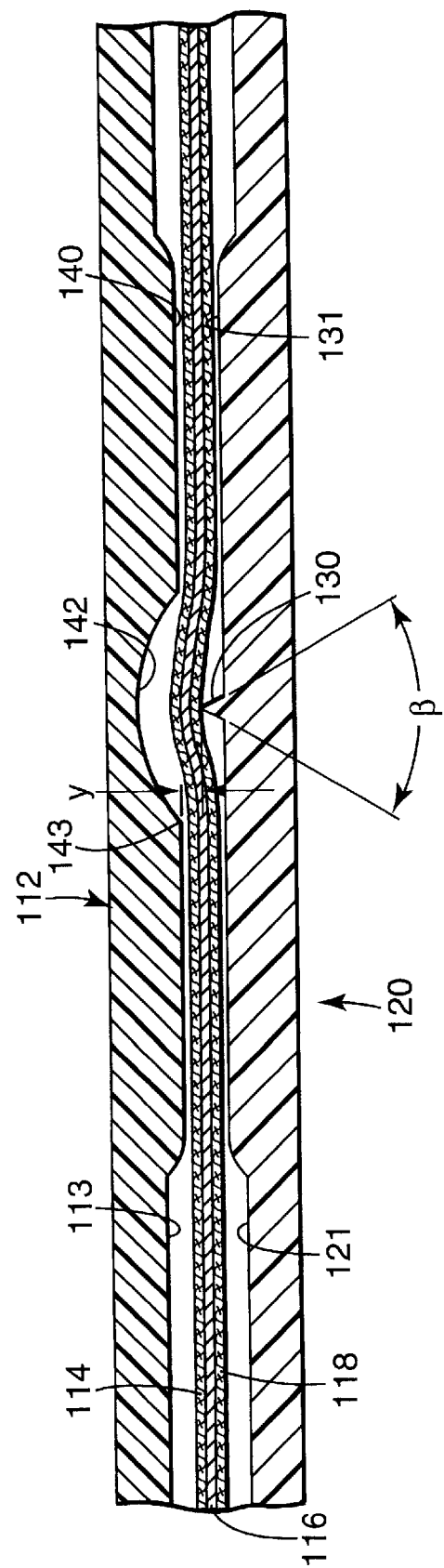
FIG. 7 is a cross-sectional view along line 7—7 in FIG. 5 showing one molded-in lifter according to the present invention.

FIGS. 5–7 depict an alternative embodiment of the present invention. FIG. 5 depicts the inner surface of a back shell 120 while FIG. 6 shows the inner surface of a cover shell 112. Back shell 120 includes a rib 124 defining the inner periphery of the media compartment of the cartridge and a rib 126 defining the outer periphery of the compartment. Magnetic recording medium 116 has innermost data storage tracks 128 and outermost data storage tracks 132.

A raised rib 130 having a controlled height according to the present invention preferably spans the width of the recordable portion of medium 116 from innermost data storage track 128 to outermost data storage track 132. Rib 130 is positioned on the inner surface of cartridge shell 120 so that it lies directly above the recess 142 formed in raised structure 140 on the inner surface of shell 112 (shown in FIG. 7) when the two shells are assembled together. The relationship between controlled height rib 130 and recess 142 in raised structure 140 is shown in FIG. 5, with recess 142 and raised structure 140 being shown in phantom lines. A cross-section taken through controlled height rib 130 and a portion of raised structure 140 is shown in FIG. 7.

By positioning the raised rib 130 directly in line with the recess 142, permanent deformation, i.e., denting, of the media 116 by the rib 130 can be prevented if the shells 112 and 120 are forced together during use or handling.

The raised structure 140 in shell 112 preferably comprises a generally planar platform located above the inner surface 113 of the shell 112. The recess 142 for receiving the controlled height rib 130 is formed in that platform and is preferably deep enough to receive the rib 130 without compressing the media 116 (and fabric liners 114 and 118) and causing permanent deformation, i.e., denting the media. When the shells 112 and 120 are pressed together, the clearance between the peak of the controlled height rib 130 and the recess 142 is preferably about 0.20 mm or greater, more preferably about 0.25 mm. The clearance distances can, however, change based on the thickness of the media and/or fabric liners.

Although the raised structure 140 is shown as a generally planar platform, it will be understood that the raised structure 140 could comprise an array of ridges or other discontinuous structure including a recessed area for receiving the raised rib 130. If an array of ridges is provided, each ridge would preferably be reduced in height in the area of the raised rib 130 to prevent compression of the media 116 between the rib 130 and the ridges forming a part of the raised structure 140.

As shown in FIGS. 5 and 7, the rib 130 is preferably formed in a generally raised platform 131 that is itself located above the remainder of the inner surface 121 of the shell 120. The platform 131 is preferably located on both sides (tangentially) of the rib 130, and more preferably is generally coextensive with the raised structure 140 on the shell 112.

By providing a generally planar raised structure 140, recess 142, raised rib 130, and generally planar platform surrounding the raised rib 130, the depicted design avoids any focused contact points between the media 116 and shell 112 and 120 that can lead to media deformation during handling.

Figure 8:
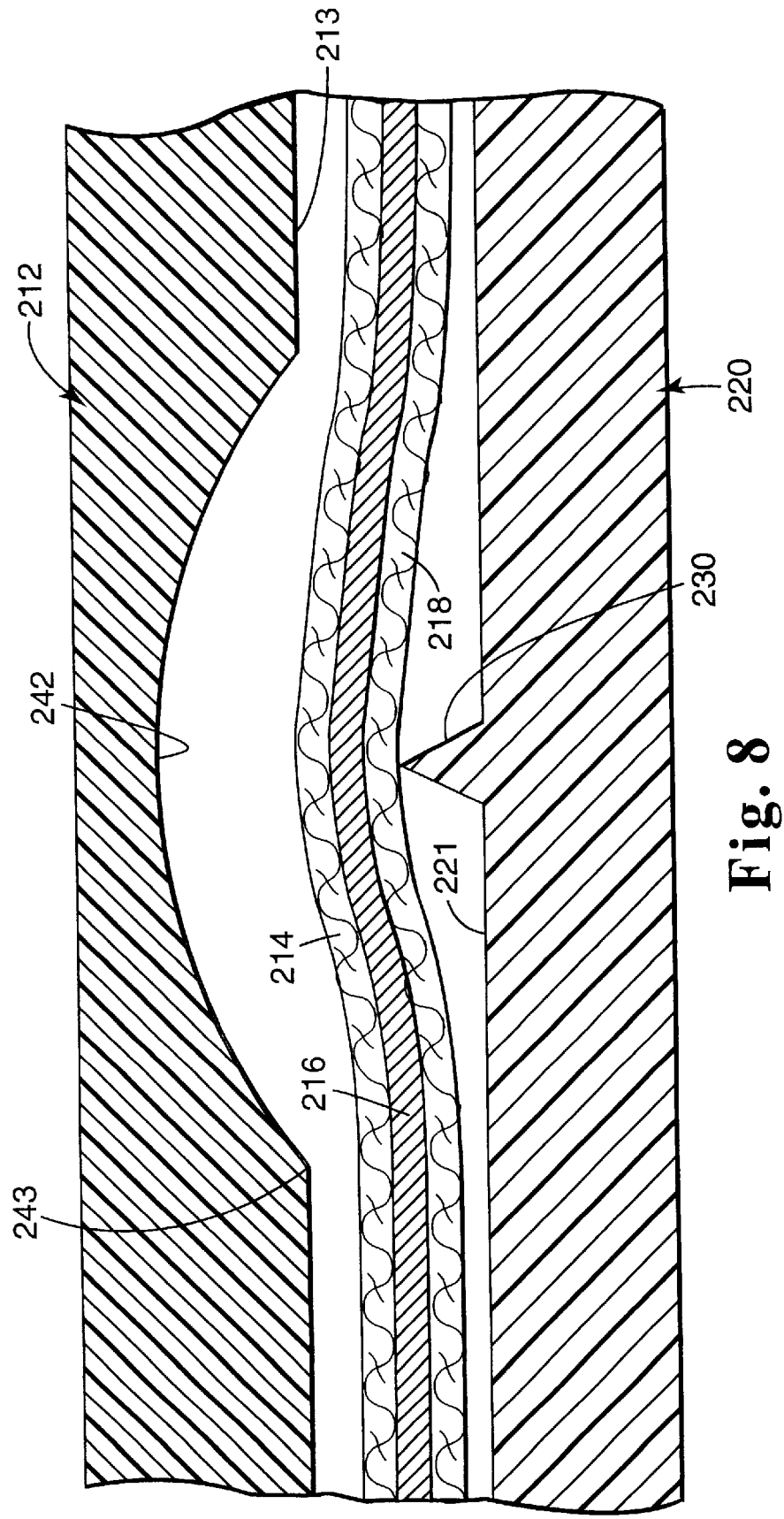
FIG. 8 is a cross-sectional view showing one molded-in lifter according to the present invention.

FIG. 8 depicts another variation of the design shown in FIGS. 5–7 in which the recess 242 is formed in the inner surface 213 of shell 212 and the controlled height rib 230 extends directly from the inner surface 221 of the shell 220. Alternatively, the recess or the raised rib could be provided on or in a platform located above the inner surface of the respective shell as desired.

In the embodiments incorporating a raised rib 130/230 having a controlled height and corresponding recess 142/242 in the opposing shell, the raised rib 130/230 preferably has a controlled height above the inner surface of the shell that lies within the range from about 0.4 mm to about 0.9 mm, more preferably about 0.5 to about 0.8 mm, and is most preferably about 0.6 mm high. The heights referred to include the height of the platform, e.g., 131, if the rib 130 is located on such a platform. Also, these heights are after adjustment of the rib to the controlled height, if necessary, during manufacturing as described in greater detail below.

Raised rib 130/230 preferably has a width of about 0.4 to about 0.5 mm at its base and is preferably initially formed, before adjustment, with a taper to form a peak on the rib as seen in FIGS. 7 and 8. It is preferred that both sides taper towards each other and meet to form an angle, $\beta$, of about 60° as shown in FIG. 7.

Referring to FIGS. 7 and 8, the arrangement of raised rib 130/230 and recess 142/242 forces medium 116/216 to bend as it moves (during rotation) over the ribs. As a portion of medium 116/216 moves over rib 130/230, the side of the medium facing rib 130/230 is cleaned by fabric liner 118/218. As the same portion of medium 116/216 moves past the trailing edge 143/243 of the recess 142/242, the side of the medium facing recess 142/242 is cleaned by fabric liner 114/214. The advantage of this design is that it provides for cleaning of medium 116/216 while allowing for relatively wide manufacturing tolerances in the formation of ribs 130/230 and recesses 142/242.

The controlled height rib 130 preferably is spaced from the recess 142 by a distance, $\gamma$, of about 0.5 mm or more, more preferably about 0.4 to about 0.6, and most preferably about 0.5 mm.

Figure 9:
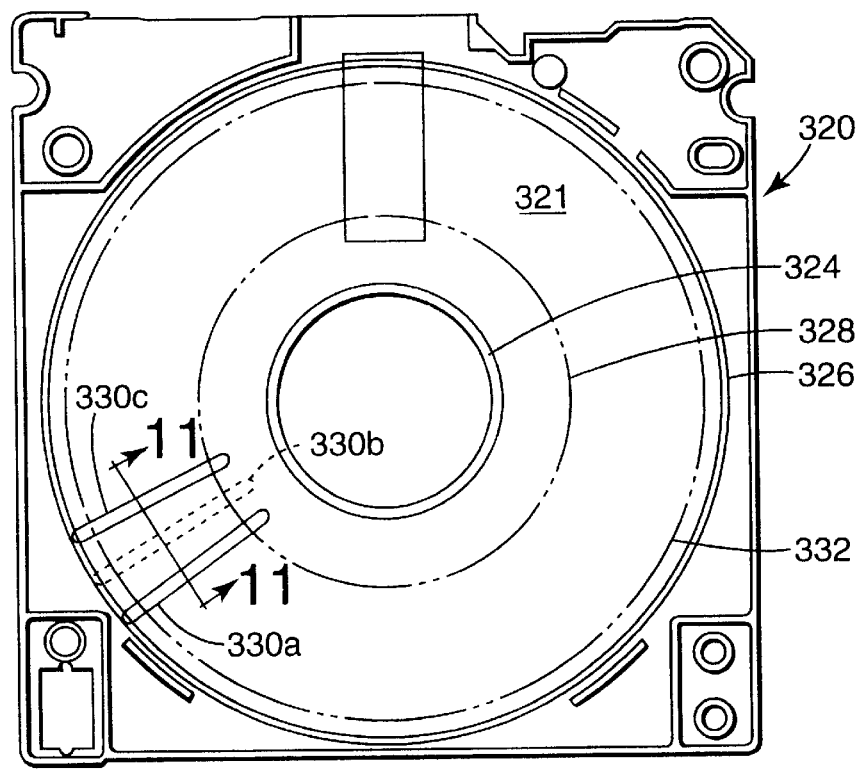
FIGS. 9 and 10 are plan views of the inner surfaces of the back and cover shell, respectively, of one magnetic recording disc cartridge according to the present invention.
Figure 10:
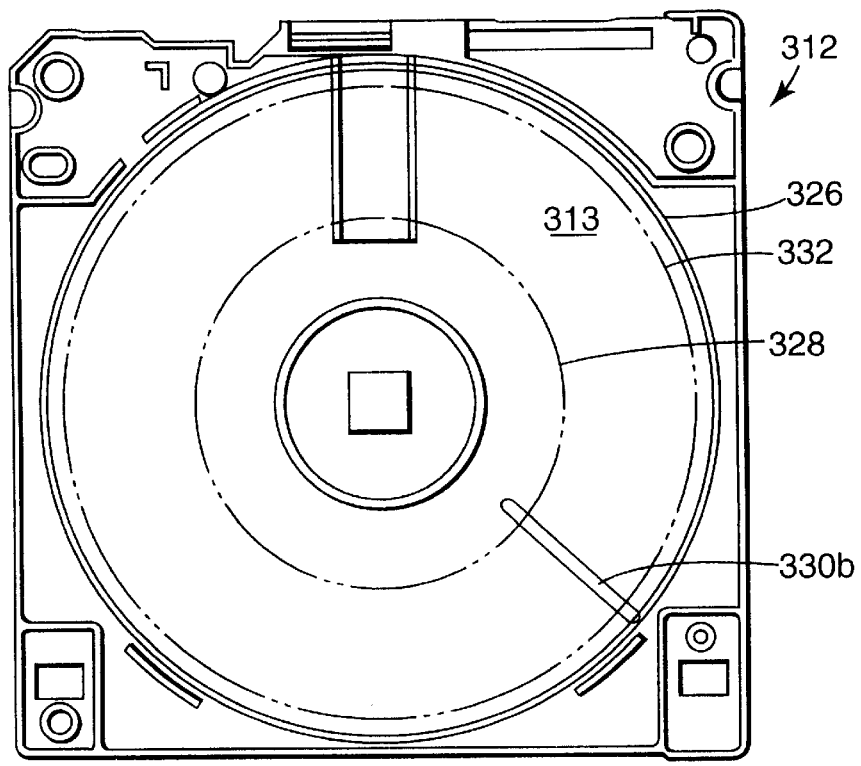
Figure 11:
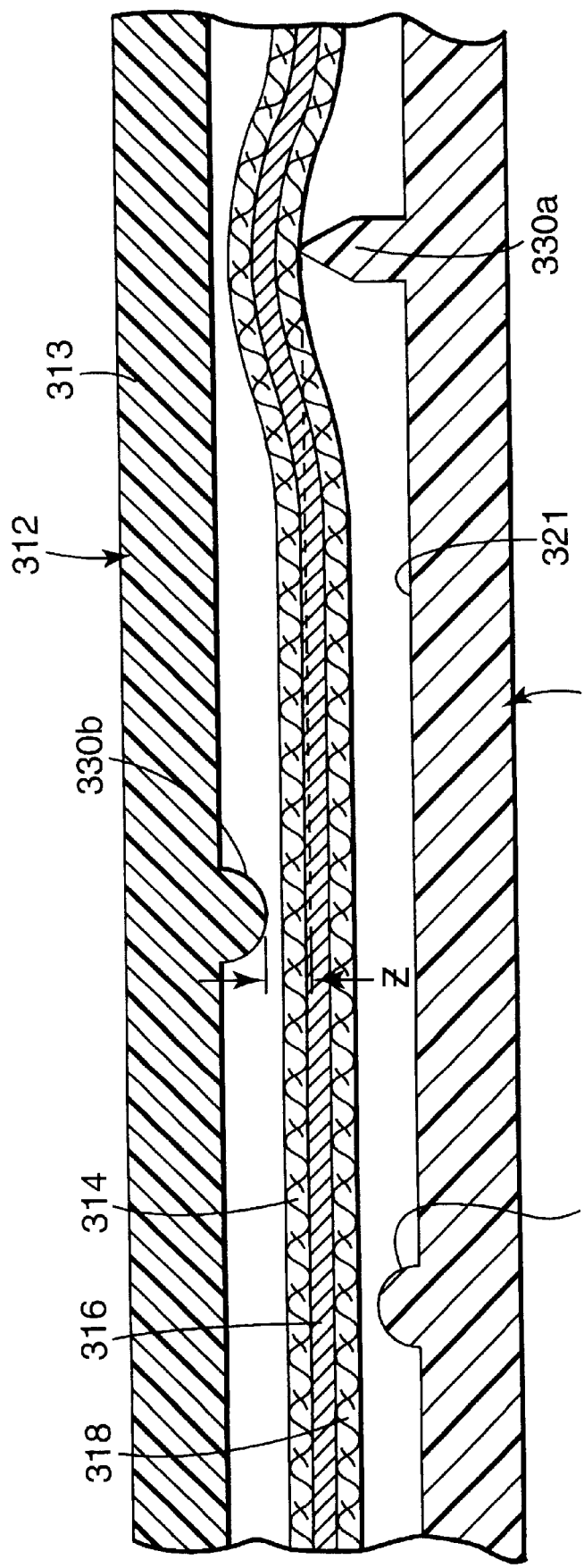
FIG. 11 is a cross-sectional view along line 11—11 in FIG. 9 showing one molded-in lifter according to the present invention.

FIGS. 9–11 depict another alternative embodiment of the present invention incorporating in a molded lifter to effect media cleaning. FIG. 9 depicts the inner surface of a back shell 320 while FIG. 10 shows the inner surface of a cover shell 312. Back shell 320 includes a rib 324 defining the inner periphery of the media compartment of the cartridge and a rib 326 defining the outer periphery of the compartment. Magnetic recording medium 316 has innermost data storage tracks 328 and outermost data storage tracks 332.

At least two raised ribs 330a and 330c are located on the inner surface 321 of the shell 320 and preferably span the width of the recordable portion of medium 316 from innermost data storage track 328 to outermost data storage track 332. An opposing rib 330b is located on the inner surface 313 of the opposing shell 312 and also preferably spans the width of the recordable portion of medium 316 from innermost data storage track 328 to outermost data storage track 332. Rib 330b is preferably located between ribs 330a and 330c when the shells 312 and 320 are assembled (as shown in FIG. 11). The relationship between ribs 330a and 330c in shell 320 and rib 330b in shell 312 is shown in FIG. 9, with rib 330b being shown in phantom lines. It is preferred that ribs 330a, 330b, and 330c be oriented generally radial to the medium 316 and that each rib be spaced about 12° from the neighboring rib or ribs when the cartridge is assembled. Although ribs 330a, 330b and 330c are preferably generally radial in orientation, it will be understood that they could lie in any desired orientation, provided that width of the recording area on media 316 is cleaned by deflection of the media over the ribs.

A cross-section taken through the ribs is shown in FIG. 11. In that view, the media preferably rotates from the right side to the left side, i.e., a given spot on the rotating media 316 would first pass rib 330a, followed by rib 330b, and last by rib 330c. It is preferred that at least one of the ribs, 330a, 330b and 330c have a controlled height above its respective inner surface to provide the desired cleaning of the media 316 while controlling rotating torque of the media 316 within desired levels.

Raised rib 330a is provided with a controlled height above the inner surface 321 of shell 320. The preferred height of the rib 330a above the inner surface 321 of the shell 320 lies within the range from about 0.5 to about 1.0 mm, more preferably about 0.6 to about 0.9 mm, and is most preferably about 0.81 mm high. These heights are after adjustment of the rib height, if necessary, as described in greater detail below. Raised rib 330a has a width of about 0.4 to about 0.5 mm at its base on inner surface 321. When initially formed along with shell 320, the sides of the rib 330a preferably taper to form a peak on the rib 330a. It is preferred that both sides taper towards each other, beginning about 0.38 mm above the inner surface 321 of shell 320, where they come together at a desired height at an angle $\alpha$, of about 60° as shown in FIG. 11.

The height of the rib 330a is preferably adjusted by deforming the peak of the rib 330a to provide a finished rib with the desired height. The various methods that can be employed to deform the rib 330a are described in greater detail below. As a result, however, the peak of the rib 330a, and any other rib provided with a controlled height in accordance with the present invention, is deformed.

For those ribs, e.g., ribs 330b and 330c whose height is not controlled after manufacture as is rib 330a, the height of each of the ribs 330b and 330c above its respective inner surface 313 or 321 lies within the range from about 0.13 to about 0.37 mm, more preferably about 0.18 to about 0.32 mm, and is most preferably about 0.25 mm.

The movement of the media 316 over the controlled height rib 330a and under rib 330b contributes to the deformation of the media 316 to effect the desired cleaning action and control the torque required to rotate the media 316. The vertical spacing between the peaks of rib 330a and 330b, z (see FIG. 11), is preferably about 0.13 to about 0.37 mm, more preferably about 0.25 mm.

In all of the embodiments described above, the cartridges include at least one raised rib having a controlled height. That raised rib provides the desired lifting action needed for proper cleaning of the magnetic recording media, while at the same time providing for controllable torque when the media is rotated. Methods of obtaining the controlled height of the raised ribs will now be described in connection with FIG. 12 below.

Figure 1:
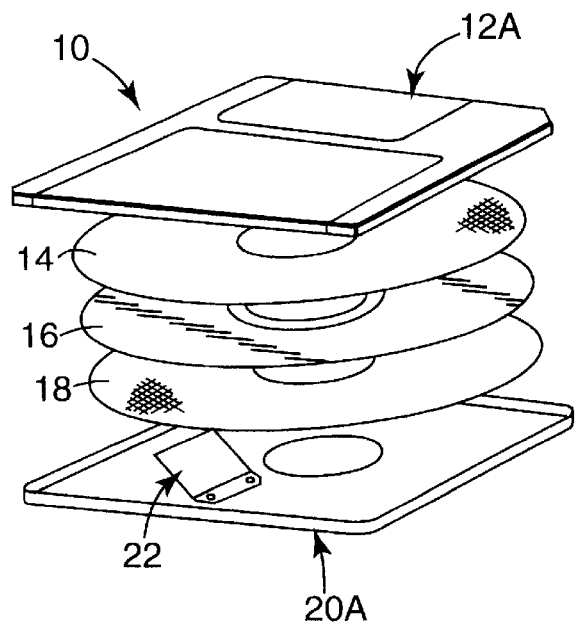
FIG. 1 is an isometric, exploded view of a prior art micro-floppy magnetic recording disc cartridge.

During the manufacture of typical diskette cartridges, finished diskette cartridges moving off the assembly line are periodically tested to measure whether the torque required to rotate the medium is within process control tolerances, usually 15 to 21 gram-centimeters. If the torque is too low (or is becoming to low), the angle of inclination of the conventional lifter 22 (see FIG. 1) may be increased on the as-yet-unfinished diskette cartridges on the assembly line, thereby increasing the drag exerted on the rotating medium by the lifter and fabric liners. Conversely, if the torque becomes too high (or is becoming too high), the angle of inclination of the conventional lifter 22 may be decreased on the as-yet-unfinished diskette cartridges on the assembly line, thereby decreasing the drag.

One potential disadvantage of replacing the conventional lifter 22 by a raised rib that is molded in the shell is that one would expect that the ability to control torque during manufacturing to be lost because of the limitations on tolerances of molded features. The present inventors have, however, solved this problem by providing raised rib lifters and a method of manufacturing them that allows the height of the ribs to be precisely controlled after the rib has been formed.

Figure 12:
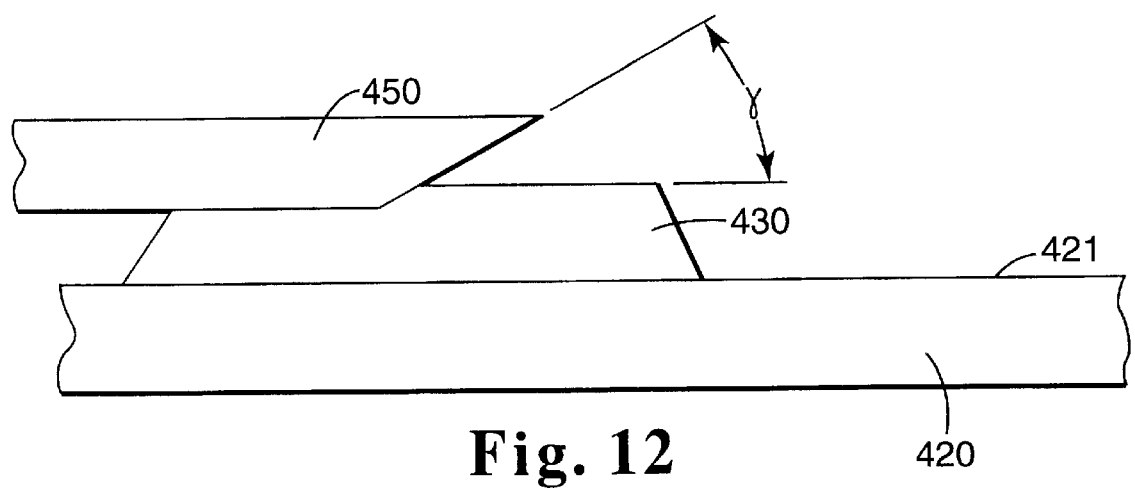
FIG. 12 is a schematic diagram depicting one method of adjusting the height of one molded-in lifter according to the present invention.

Referring now to FIG. 12, which depicts one method of controlling the height of the rib 430 above the inner surface 421 of the shell 420. The rib 430 is molded at the same time as the cartridge shell to have a height slightly different than what is expected to be the ideal average height. It is preferred that the height of the rib 430 as molded be slightly greater than the expected ideal height. The top of the rib 430 as molded with the shell 420 preferably tapers from the peak at an angle of about 60° from what is expected to be the highest possible acceptable height, as shown in FIGS. 4, 7 and 11.

During the assembly process, the top of rib 430 is deformed by moving a sliding point-contact angled surface tool 450 along the length of the rib 430 so that its height relative to the inner surface 421 of shell 420 is decreased to the expected ideal average height. This is referred to herein as "cold-forming" the rib 430. The angle, $\gamma$, of the tool face 452 with respect to the rib 430 is preferably about 10° and the speed of the tool during the deformation process is about 100 mm/second. The tool 450 can be manufactured from any suitable material, although one preferred material is hardened tool steel. The shell 420 and tool 450 are preferably held at ambient temperatures, i.e., about 20° C., during this process.

Figure 13:
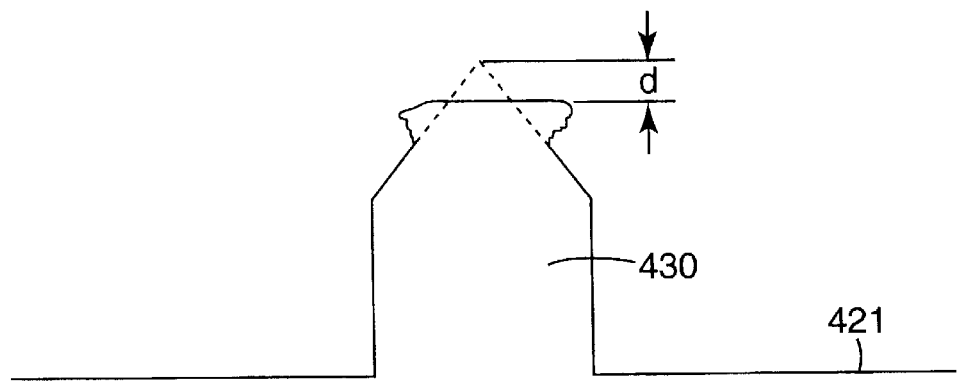
FIG. 13 is a schematic cross-sectional diagram of a molded-in lifer having a controlled height as adjusted by one method according to the present invention.

The result of the deformation of the rib 430 is shown in FIG. 13 which includes a cross-section of the rib 430 after deformation, showing displacement of the rib material and blunting of the peak originally formed in the rib 430 as molded. The decrease in height of the rib 430 from its original height (shown in phantom) is shown as d in FIG. 13. That distance d is preferably about 0.05 mm or greater, more preferably about 0.05 to about 0.1 mm.

Variations on this process include striking the entire rib with a flat tool in a single blow, although that can produce an impression on the outside surface of the shell. Also, the rib 430 and/or the tool 450 could be heated to facilitate control of the rib height. Additionally, chemicals could be used to facilitate adjustment of the rib height.

The finished diskette cartridges coming off the assembly line are periodically tested to measure whether the torque required to rotate the medium is too high or too low. If the torque is too low (or becoming too low), the controlled height of the rib on the as-yet-unfinished diskette cartridges on the assembly line may be increased by raising the tool 450 with respect to the inner surface 421, thereby increasing drag and torque on the media during rotation over the rib 430. Conversely, if the torque becomes too high (or is becoming too high), the height of the rib on the as-yet-unfinished diskette cartridges on the assembly line may be decreased by lowering the tool 450 with respect to the inner surface 421, thereby decreasing drag and torque on the media during rotation over the rib 430.

Some materials for manufacturing the shells and ribs that are suitable for cold-forming to control the rib height are engineering grade resins used for disc cartridges. Examples of suitable resins include, but are not limited to: styrenes (including acrylonitrile butadiene styrene), polypropylene, and composite resins. Other materials may also be used to form the shells and molded ribs according to the present invention.

The choice of materials can impact the method of controlling height based on the physical properties of the materials. It is preferred that the materials and processes used result in plastic deformation without fracture to provide a smooth, controlled height for the ribs.

Figure 14:
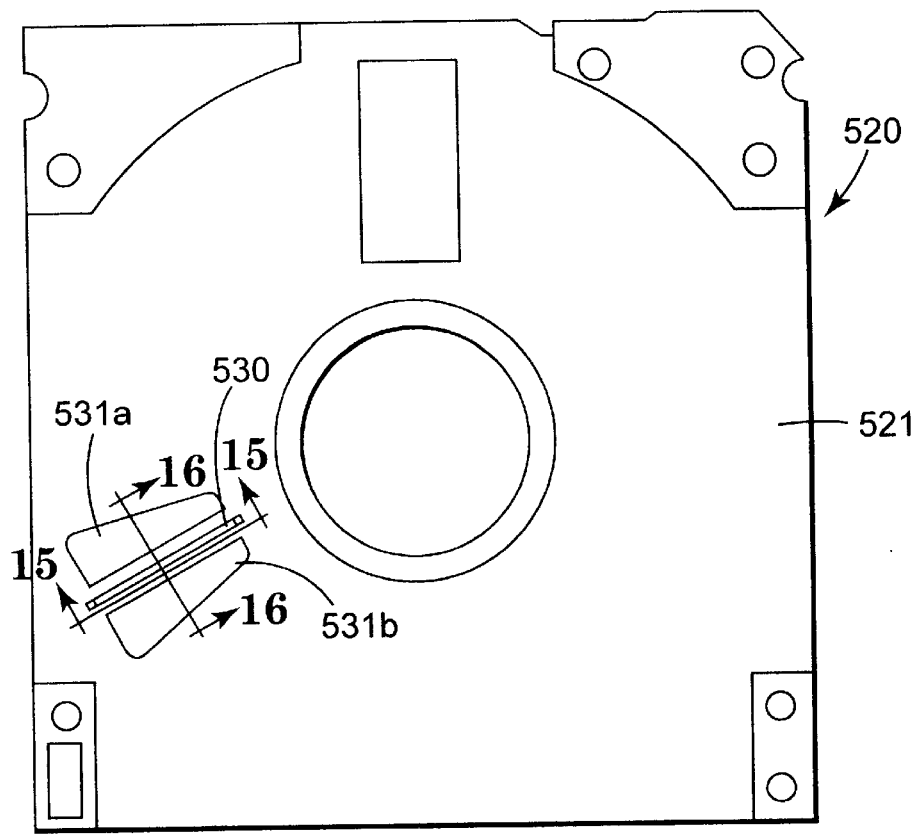
FIG. 14 is a plan view of the inner surface of the back shell of one magnetic recording disc cartridge according to the present invention.
Figure 15:
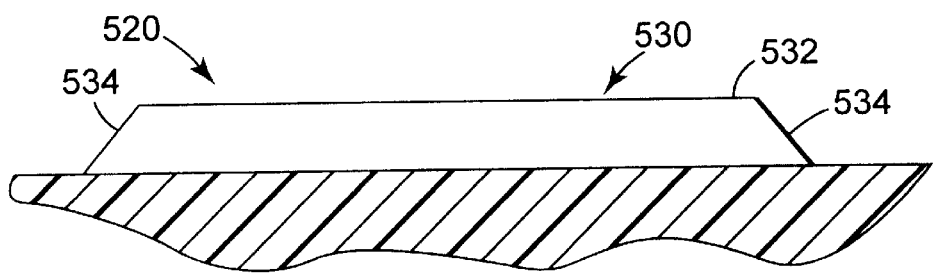
FIG. 15 is an enlarged partial cross-sectional view taken along line 15—15 in FIG. 14.
Figure 16:
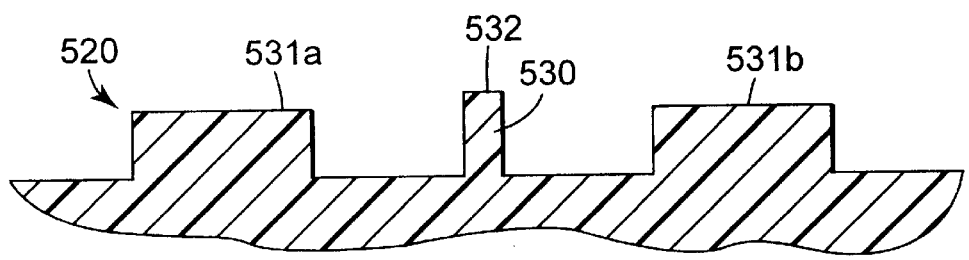
FIG. 16 is an enlarged partial cross-sectional view taken along line 16—16 in FIG. 14.

FIGS. 14–16 depict another variation of the design of molded-in lifters useful in connection with the present invention. FIG. 14 depicts the inner surface 521 of only the back shell 520, and it should be understood that this back shell 520 can be mated with any suitable cover shell to form a disc cartridge. One example of a useful design for a cover shell useful with the back shell 520 is the cover shell 112 depicted in FIG. 6 above.

In the back shell 520, a raised rib 530 having a controlled height according to the present invention preferably spans the width of the recordable portion of the medium. The ends 534 of the rib 530 are preferably angled as shown in FIG. 15 to facilitate the cold-forming process described above. The rib 530 is somewhat different in that its cross-sectional profile does not form a peak as depicted above in, e.g., FIG. 7. Rather, the rib 530 has generally blunt or flattened top 532 as molded, but which is still deformed to provide a controlled height rib as discussed above.

Like the raised ribs described above, raised rib 530 is preferably positioned on the inner surface 521 of cartridge shell 520 so that it will lie directly above a corresponding recess formed in the mating cover shell, e.g., the recess 142 formed in raised structure 140 on the inner surface of shell 112, when the two shells are assembled together. By positioning the raised rib 530 directly in line with a recess in a cover shell having a depth sufficient to receive the rib 530 without compressing the media with the rib 530, permanent deformation, i.e., denting, of the media by the rib 530 can be prevented if the shells are forced together during use or handling.

Raised rib 530 preferably extends directly from the inner surface 521 of the back shell 520 and is preferably flanked by a pair of raised platforms 531a and 531b (referred to commonly as "platforms 531"). The platforms 531 are preferably located on both sides (tangentially) of the rib 530 and also preferably extend radially as does the rib 530. Unlike the platform 131 described in connection with rib 130 in FIGS. 5 and 7 above, the platforms 531 are spaced apart or separated from the raised rib 530 as is seen in FIGS. 14 and 16. The raised platforms 531 provide the same functions as the single raised platform 131 provides in shell 120, i.e., they prevent the raised rib 530 from deforming or denting the media if the cartridge shells are compressed. In addition, the preferred raised platforms 531 have smooth upper surfaces to avoid providing focused contact points themselves that could also deform the media. It is further preferred that the raised platforms 531 be generally coextensive with any raised platforms in the mating cover shell, e.g., platform 140 in cover shell 112.

Because the platforms 531 are spaced apart or separated from the raised rib 530 (which extends directly from the inner surface 521 of the back shell 520), the raised rib 530 can generally be deformed as described above to a greater degree during the manufacturing process, thereby providing improved flexibility and control over the drag placed on the media by the liners. The rib 530 can be deformed to a larger degree because it is not located on a raised platform, but rather it extends directly from the inner surface 521 of the back shell 520. As a result, all or nearly all of its height (0.034 inches or 0.86 millimeters in one preferred embodiment) can be reduced by methods described herein to obtain the desired controlled height, whereas the amount of deformation, e.g., rib 130 in FIGS. 5 and 7 is limited by the height of the platform 131.

Figure 17:
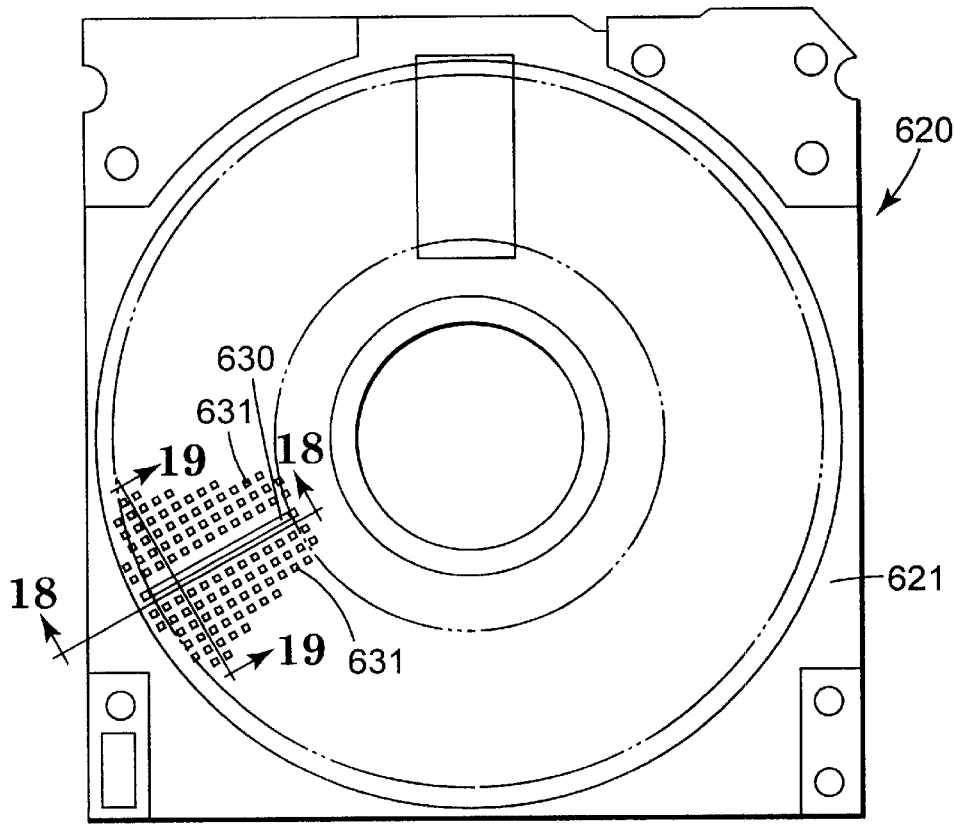
FIG. 17 is a plan view of the inner surface of the back shell of one magnetic recording disc cartridge according to the present invention.
Figure 18:
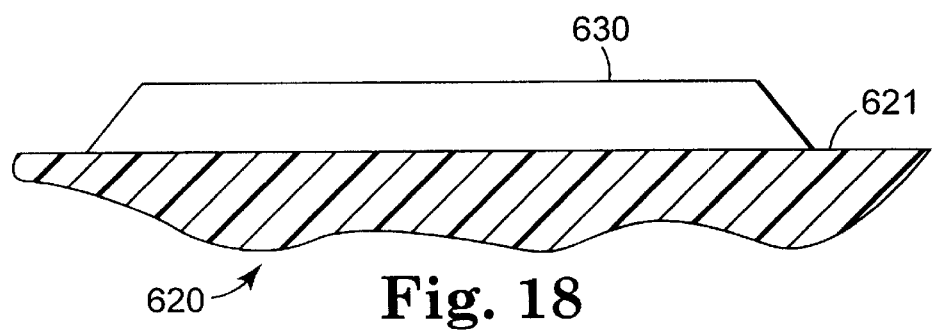
FIG. 18 is an enlarged partial cross-sectional view taken along line 18—18 in FIG. 17.
Figure 19:
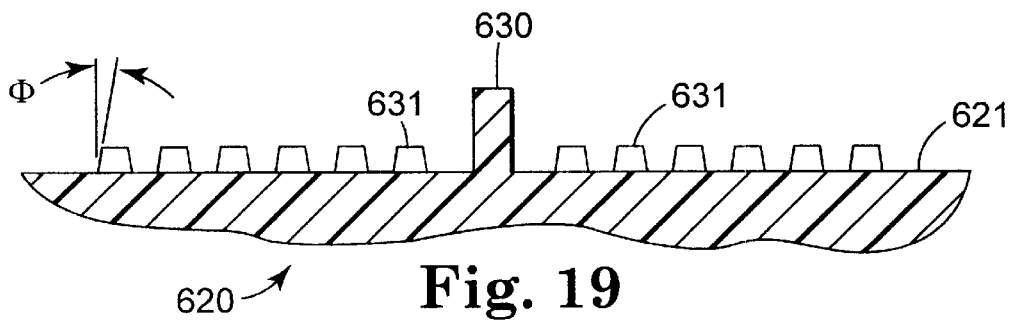
FIG. 19 is an enlarged partial cross-sectional view taken along line 19—19 in FIG. 17.

Yet another embodiment of a back shell 620 is depicted in FIGS. 17–19. Like raised rib 530 described above, raised rib 630 formed in the back shell 620 preferably extends directly from the inner surface 621 of the back shell 620.

One difference between back shell 520 and back shell 620, however, is that each of the raised platforms 531a and 531b of back shell 520 are replaced by a plurality of raised platforms 631 that, in many respects, provide the same functions as the raised platforms 531 used in connection with back shell 520 described above. In other words, the plurality of small raised platforms 631 generally prevent the raised rib 630 from deforming the media. In addition, the plurality of small raised platforms 631 preferably include flat upper surfaces to avoid focused contact points between the media and shells that can lead to media deformation by the platforms 631 themselves if the shells are pressed together.

The distribution of each of the plurality of small platforms 631 is largely a matter of design choice, although they do preferably extend over the radial width of the media and will generally correspond to an opposing platform (if any) formed in the mating cover shell. In one preferred embodiment, the small platforms 631 are generally square in shape with a dimension of about 0.035 inches (0.89 millimeters) per side at the base and are regularly spaced apart by about 0.010 inches (0.25 millimeters). The vertical sides of the platform preferably have a draft angle $\phi$ (see FIG. 19) of about 10 degrees to facilitate release from a mold.

One of the advantages of providing a plurality of smaller platforms 631 in place of a larger platform, e.g., platform 131 as described in connection with back shell 120 or platforms 531 as described in connection with back shell 520, is reduced deformation after cooling. Although the inventors due not wish to be limited by the following theory, it is surmised that the larger mass of material required for the larger solid platform or platforms can result in residual stresses in the finished part (due to differential cooling rates) that can deform the shells. By reducing the amount of material required to perform the desired function, i.e., prevent compression of the raised rib 630 against the media, the residual stresses can be reduced by providing better control over the cooling of the shells during molding.

Although each platform 631 in the plurality of platforms depicted in FIGS. 16 and 19 are square and provided in a regular (i.e., repeating) pattern, it should be understood that any pattern (repeating or non-repeating) of a plurality of raised structures that provide the desired functions of preventing compression of the media by the raised rib while also avoiding focused contact points between themselves and the media could be provided in line with the present invention. Examples of other platform configurations that could be substituted for the depicted pattern of square platforms include, but are not limited to a regular or irregular pattern of spaced apart cylindrical platforms; a regular or irregular pattern of ridges with flattened upper surfaces; etc.

Various modifications and alterations of this invention will become apparent to those skilled in the art without departing from the scope of this invention, and it should be understood that this invention is not to be unduly limited to the illustrative embodiments and method set forth herein.

What is claimed is:

1. A method of forming a lifter for supporting a fabric liner of a flexible magnetic recording disc so that the disc is cleaned by rotation of the disc with respect to the liner, wherein the disc is housed within a cartridge comprising first and second shells, each of the first and second shells having an inner and outer surface, the method comprising the steps of:

a) providing the first shell having a raised rib on its inner surface, the rib having a formed height; and b) adjusting the height of the raised rib from a formed height to a controlled height by deforming the rib.

2. The method of claim 1, wherein the step of adjusting comprises cold-forming the rib.

3. The method of claim 1, wherein the controlled height, to which the rib is adjusted, is determined based on the torque required to rotate the disc within the cartridge.

4. The method of claim 1, further comprising providing a raised structure on the inner surface of the second shell, the raised structure being offset tangentially from the rib in the first shell when the first and second shells have been assembled to form the cartridge.

5. The method of claim 1, wherein the step of adjusting the height of the rib comprises decreasing the height of the rib from the formed height to the controlled height.

6. The method of claim 5, wherein the step of decreasing the height of the rib comprises decreasing the height of the rib by about 0.05 millimeters or more.

7. The method of claim 1, further comprising:

providing a raised platform on the inner surface of the second shell; and providing a recessed area in the raised platform on the inner surface of the second shell, the recessed area being located directly opposite from the rib on the inner surface of the first shell when the first and second shells are assembled to form the cartridge.

8. The method of claim 7, wherein the recessed area has a depth within the raised platform, and further wherein the depth of the recessed area is such that the rib does not contact the recessed area when the first and second shells are pressed together during use of handling.

9. The method of claim 1, further comprising providing a plurality of raised platforms located on each side of the rib, wherein each of the raised platforms is located on the inner surface of the first shell and is separated from the rib, and further wherein the controlled height of the rib above the inner surface of the first shell is greater than the height of the raised platforms above the inner surface of the first shell.

10. The method of claim 9, wherein each of the plurality of raised platforms comprises a smooth upper surface.

11. The method of claim 9, wherein each of the plurality of raised platforms is physically and chemically integral with the inner surface of the first shell.

12. The method of claim 1, further comprising providing a recessed area in the second shell, the recessed area being located directly opposite from the rib when the first and second shells are mated together.

13. The method of claim 12, wherein the recessed area has a depth and the rib has a height, and further wherein the depth of the recessed area is greater than the height of the rib, such that the rib does not contact the recessed area when the first and second shells are pressed together during use or handling.

14. The method of claim 12, further comprising providing at least one raised platform on each side of the rib, wherein each of the raised platforms is located on the inner surface of the first shell and is separated from the rib, and further wherein the controlled height of the rib above the inner surface of the first shell is greater than the height of the raised platforms above the inner surface of the first shell.

15. The method of claim 14, wherein each of the raised platforms is provided with a smooth upper surface.

16. A method of manufacturing a plurality of flexible magnetic recording disc cartridges wherein each of the disc cartridges includes a lifter for supporting at least one fabric liner of a flexible magnetic recording disc so that the disc is cleaned by rotation of the disc with respect to the liner and wherein the disc is housed within the disc cartridge comprising first and second shells, each of the first and second shells having an inner and outer surface, comprising:

providing pairs of first and second shells wherein each of the first shells comprises at least one raised rib on its inner surface, the raised rib having a formed height;

adjusting the height of at least one of the raised ribs on the inner surfaces of each of the first shells from a formed height to a controlled height by deforming the raised ribs;

assembling each pair of first and second shells to form an assembled cartridge containing the at least one fabric liner and the flexible magnetic recording disc; rotating the magnetic recording disc within the assembled cartridge;

measuring the torque required to rotate the magnetic recording disc within the assembled cartridge; and varying the amount by which the raised ribs on the inner surfaces of the first shells are deformed in response to a change in the torque required to rotate the magnetic recording disc within the assembled cartridge.

17. The method of claim 16, wherein the adjusting comprises cold-forming the raised ribs in each of the first shells.

18. The method of claim 16, wherein the adjusting comprises decreasing the formed height of the raised ribs.

19. The method of claim 16, wherein the adjusting comprises decreasing the formed height of the raised ribs by about 0.05 millimeters or more.

20. The method of claim 16, further comprising providing a raised structure on the inner surface of the second shell, the raised structure being offset tangentially from the ribs in the first shell when the first and second shells are assembled.

21. The method of claim 16, wherein the second shell further comprises:

a raised platform on the inner surface of the second shell; and a recessed area in the raised platform on the inner surface of the second shell, the recessed area being located directly opposite from the ribs on the inner surface of the first shell when the first and second shells are assembled.

22. The method of claim 21, wherein the recessed area has a depth within the raised platform and further wherein the depth of the recessed area is such that the ribs do not contact the recessed area when the first and second shells are pressed together during use or handling.

23. The method of claim 16, wherein each of the first shells comprises a plurality of raised platforms located on each side of the ribs, each of the raised platforms being located on the inner surface of the first shell and separated from the ribs, and further wherein the controlled height of the ribs above the inner surface of the first shell is greater than the height of the raised platforms above the inner surface of the first shell.

24. The method of claim 23, wherein each of the plurality of raised platforms comprises a smooth upper surface.

25. The method of claim 23, wherein each of the plurality of raised platforms is physically and chemically integral with the inner surface of the first shell.

26. The method of claim 16, wherein each of the second shells further comprises a recessed area located directly opposite from the raised ribs adjusted to the controlled height when one of the second shell is assembled with one of the first shells.

27. The method of claim 26, wherein the recessed area has a depth and further wherein the depth of the recessed area is such that the ribs do not contact the recessed area when the first and second shells are pressed together during use or handling.

28. The method of claim 27, wherein each of the first shells comprises at least one raised platform on each side of the raised rib in the first shell, each of the raised platforms being located on the inner surface of the first shell and separated from the raised ribs, and further wherein the controlled height of the ribs above the inner surface of the first shell is greater than the height of the raised platforms above the inner surface of the first shell.

29. The method of claim 28, wherein each of the raised platforms comprises a smooth upper surface.

* * * * *